United States Patent
Tei et al.

(10) Patent No.: US 11,081,698 B2
(45) Date of Patent: Aug. 3, 2021

(54) CATHODE ACTIVE MATERIAL CONTAINING BORON AND CARBON, AND MAGNESIUM SECONDARY BATTERY USING THE SAME

(71) Applicant: Panasonic Intellectual Property Management Co., Ltd., Osaka (JP)

(72) Inventors: Go Tei, Osaka (JP); Toshiro Kume, Hyogo (JP); Akira Kano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 86 days.

(21) Appl. No.: 16/384,958

(22) Filed: Apr. 16, 2019

(65) Prior Publication Data

US 2019/0326599 A1    Oct. 24, 2019

(30) Foreign Application Priority Data

Apr. 23, 2018    (JP) .............................. JP2018-081948

(51) Int. Cl.
| | |
|---|---|
| *H01M 4/587* | (2010.01) |
| *C01B 32/90* | (2017.01) |
| *H01M 10/054* | (2010.01) |
| *H01M 4/02* | (2006.01) |

(52) U.S. Cl.
CPC .............. *H01M 4/587* (2013.01); *C01B 32/90* (2017.08); *H01M 10/054* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2011/0189543 A1 | 8/2011 | Choi et al. | |
| 2012/0219856 A1 | 8/2012 | Doe et al. | |
| 2012/0219859 A1 | 8/2012 | Doe et al. | |
| 2016/0111720 A1 | 4/2016 | Arthur et al. | |
| 2018/0287137 A1* | 10/2018 | Tei ........................ | H01M 4/133 |

FOREIGN PATENT DOCUMENTS

| | | |
|---|---|---|
| JP | 2011-165639 | 8/2011 |
| JP | 2013-533577 | 8/2013 |
| JP | 2016-081930 | 5/2016 |
| WO | 2016/143675 | 9/2016 |

OTHER PUBLICATIONS

Xiong, J., Cai, Q., Ma, Z. et al. Enhancement of Critical Current Density in $MgB_2$ Bulk with CNT-coated Al Addition. J Supercond Nov Magn 27, 1659-1664 (2014). https://doi.org/10.1007/s10948-014-2513-4.*

Long Yu et al., "Electrochemical insertion of magnesium ions into $V_2O_5$ from aprotic electrolytes with varied water content", Journal of Colloid and Interface Science vol. 278 Issue 1, Oct. 1, 2004, pp. 160-165.

* cited by examiner

*Primary Examiner* — Laura Weiner
(74) *Attorney, Agent, or Firm* — McDermott Will & Emery LLP

(57) ABSTRACT

A cathode active material for magnesium secondary batteries includes a material containing magnesium, boron, and carbon. The material has a layered structure.

10 Claims, 1 Drawing Sheet

CATHODE ACTIVE MATERIAL CONTAINING BORON AND CARBON, AND MAGNESIUM SECONDARY BATTERY USING THE SAME

BACKGROUND

1. Technical Field

The present disclosure relates to a cathode active material for magnesium secondary batteries and a magnesium secondary battery that uses this cathode active material.

2. Description of the Related Art

In recent years, it has been expected that magnesium secondary batteries, which operate with the use of two-electron reactions of magnesium, will be developed as a new type of battery that surpasses the existing lithium-ion secondary batteries in capacity. However, few cathode active materials have been reported to be capable of occluding and releasing magnesium.

For example, Long Yu et al., "Electrochemical insertion of magnesium ions into $V_2O_5$ from aprotic electrolytes with varied water content," Journal of Colloid and Interface Science, Volume 278, Issue 1, 1 Oct. 2004, pages 160-165 discloses $V_2O_5$ as a cathode active material for magnesium secondary batteries.

SUMMARY

In one general aspect, the techniques disclosed here feature a cathode active material for magnesium secondary batteries. The cathode active material includes a material containing magnesium, boron, and carbon, and the material has a layered structure.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
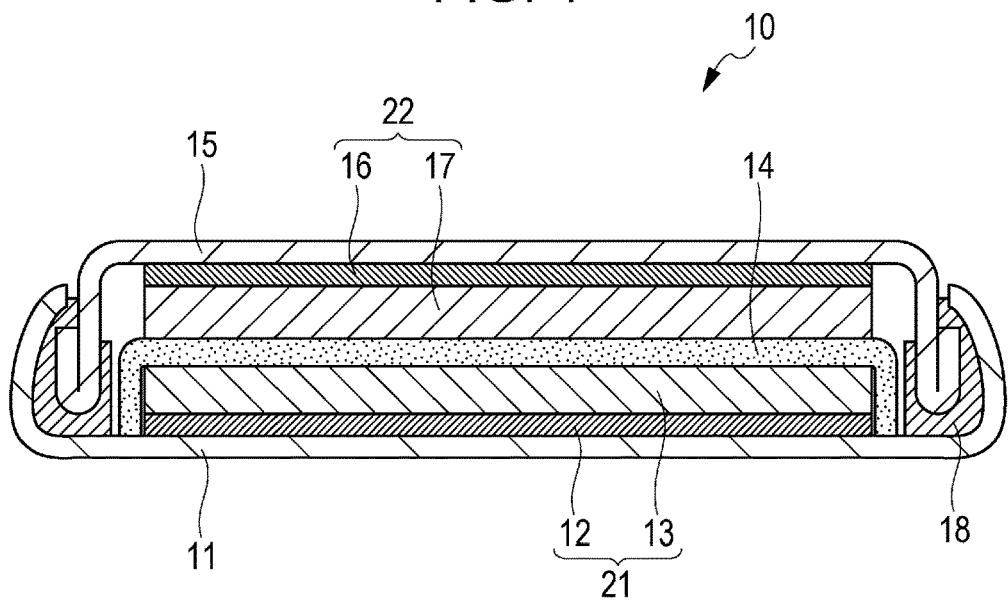
FIG. 1 is a cross-section schematically illustrating an exemplary construction of a magnesium secondary battery.

The following describes a cathode active material according to an embodiment in detail using drawings. A magnesium secondary battery that uses this active material is also described.

The following description is entirely about general or specific examples. Information such as numerical values, compositions, shapes, thicknesses, electrical properties, and structures of secondary batteries is illustrative and not intended to limit any aspect of the disclosure, and those elements that are not recited in an independent claim, which defines the most generic concept, are optional.

1. Cathode Active Material

Magnesium secondary batteries are promising candidates for higher-capacity secondary batteries by virtue of the two-electron reactions of magnesium they use to operate. Examples of known cathode active materials for magnesium secondary batteries include vanadium oxide and composite oxides containing magnesium and a transition metal. These substances, however, are limited in capacity because they all contain oxygen. Oxygen ions interact with magnesium ions very strongly, and such interactions prevent the cathode active material from occluding and releasing magnesium ions.

As a solution to this, the inventors studied potential use of an oxygen-free carbon material as a cathode active material for magnesium secondary batteries and have found the novel cathode active material detailed below.

A cathode active material according to an embodiment includes a carbon material containing magnesium, boron, carbon. This carbon material has a layered structure and is capable of occluding and releasing magnesium. The carbon material may be a graphite-like material.

The carbon material may include multiple layers containing boron and carbon. The magnesium may be positioned between these layers. Each layer may have a structure in which part of carbon forming graphite has been replaced with boron. The replacement with boron reduces the electron density in each layer, thereby helping magnesium move between layers.

The carbon material may further contain lithium. If the carbon material includes multiple layers containing boron and carbon, the lithium may be positioned between these layers.

Alternatively, the carbon material may further contain calcium. If the carbon material includes multiple layers containing boron and carbon, the calcium may be positioned between these layers.

The carbon material may be represented by the composition formula $Mg_xM_yB_zC_{1-z}$ (where M denotes at least one selected from the group consisting of Li, Ca, and Mg, $x>0$, $y>0$, and $x+y<z<1.0$).

z may further satisfy, for example, $z \leq 0.5$. That is, the quantity of carbon atoms may be equal to or greater than the quantity of boron atoms. This gives the carbon material graphite-like properties, thereby helping magnesium move between layers. z may further satisfy $z \leq 0.25$.

The structure of the carbon material can be identified or deduced from, for example, an XRD chart, a chart obtained by x-ray diffraction (XRD). The composition of the carbon material according to this embodiment can be identified from, for example, a spectrum obtained by inductively coupled plasma (ICP) emission spectrometry.

2. Production of the Cathode Active Material

The following describes an example of how to produce a carbon material according to this embodiment.

The carbon material is obtained by, for example, mixing a carbon source, a boron source, and a metal source (e.g., a calcium source, a magnesium source, or a lithium source) and heating the resulting mixture in an inert atmosphere.

First, a carbon source, a boron source, and a metal source are prepared as raw materials.

The carbon source can be, for example, graphite, an amorphous carbon material, or an organic material. Examples of types of graphite include vein graphite, flake graphite, and artificial graphite. Examples of amorphous carbon materials include activated carbon, carbon fiber, carbon black, and coke. Examples of organic materials include synthetic resins, such as polyvinyl alcohol.

The boron source can be, for example, boron, boric acid, calcium boride, or a diboride (e.g., aluminum diboride or magnesium diboride).

The calcium source can be, for example, calcium metal, calcium hydride, calcium hydroxide, calcium carbide, or calcium carbonate.

The magnesium source can be, for example, magnesium metal, magnesium hydride, magnesium hydroxide, magnesium carbide, or magnesium carbonate.

The lithium source can be, for example, lithium metal, lithium hydride, lithium hydroxide, lithium carbide, or lithium carbonate.

The carbon, boron, and metal sources do not need to be prepared as separate materials. For example, calcium boride may be used as a source of both boron and calcium.

Each raw material can be in, for example, particle, fiber, or sheet form. The raw materials may be particles having an average diameter of 1 μm to 100 μm or a fiber having an average diameter of 1 μm to 100 μm to enable easy processing of the cathode active material formed therefrom. As used herein, the term "average diameter" refers to the median spherical equivalent diameter of the material.

The raw materials are weighed out in accordance with the target composition of the carbon material.

The apportioned raw materials are then mixed.

The mixing device may be a mortar and pestle or a mechanical mixer. The mixing method is, for example, dry mixing.

The resulting mixture is then fired in an inert atmosphere.

The inert gas can be, for example, nitrogen, argon, helium, or neon. Nitrogen, for example, is selected as the inert gas for cost reasons.

The temperature condition depends on the raw materials used and/or the target composition of the carbon material, but by way of example, it is set to a temperature from 1000° C. to 2000° C. For example, if the carbon source is graphite, the mixture is heated at a temperature of 1000° C. to 2000° C. to dissolve boron and the metal (e.g., magnesium) in the graphite. If the carbon source contains a non-carbon element, for example, the mixture is first heated at approximately 1000° C. to evaporate the non-carbon element, and then the temperature is increased to graphitize carbon and at the same time to dissolve boron and the metal (e.g., magnesium) in the graphite formed.

This gives the carbon material. If necessary, the carbon material may be subjected to an extra heat treatment and/or acid cleaning. By doing these, the elemental proportions in the carbon material can be adjusted.

It should be noted that the carbon material described in "[1. Cathode Active Material]" contains magnesium, and this magnesium element may come from a magnesium source during the above production process or may be introduced by electrochemically occluding magnesium in a carbon material produced as above.

For example, if the metal source is a lithium source, a carbon material that contains lithium, boron, and carbon is first produced. This carbon material is then electrically charged and discharged in an electrolyte containing magnesium ions. This first causes part of the lithium to be irreversibly released from between layers of the carbon material and then magnesium to be reversibly occluded in the spaces left after the elimination of lithium.

If the metal source is a calcium source, for example, a carbon material that contains calcium, boron, and carbon is first produced. This carbon material is then electrically charged and discharged in an electrolyte containing magnesium ions. This first causes part of the calcium to be irreversibly released from between layers of the carbon material and then magnesium to be reversibly occluded in the spaces left after the elimination of calcium.

3. Magnesium Secondary Battery

[3-1. Overall Configuration]

A cathode active material according to this embodiment can be used in a magnesium secondary battery. That is, a magnesium secondary battery includes a cathode containing a cathode active material according to "[1. Cathode Active Material]," an anode, and an electrolyte that has magnesium ion conductivity.

FIG. 1 is a cross-section schematically illustrating an exemplary construction of a magnesium secondary battery 10.

The magnesium secondary battery 10 includes a cathode 21, an anode 22, a separator 14, a casing 11, a sealing plate 15, and a gasket 18. The separator 14 is between the cathode 21 and anode 22. The cathode 21, anode 22, and separator 14 have been impregnated with a nonaqueous electrolyte and are housed in the casing 11. The casing 11 is closed with the gasket 18 and sealing plate 15.

The structure of the magnesium secondary battery 10 may be, for example, cylindrical, square, button-shaped, coin-shaped, or flat-plate.

[3-2. Cathode]

The cathode 21 includes a cathode collector 12 and a cathode active material layer 13 on the cathode collector 12.

The cathode active material layer 13 contains a cathode active material according to "[1. Cathode Active Material]."

The cathode active material layer 13 may optionally contain an electrically conductive agent, a binder, and/or an ionic conductor.

The conductive agent can be, for example, a carbon material, metal, inorganic compound, or electrically conductive polymer. Examples of carbon materials include graphite, such as natural graphite (e.g., vein and flake graphite) and artificial graphite, acetylene black, carbon black, Ketjenblack, carbon whiskers, needle coke, carbon nanotubes, carbon fiber, graphene, fullerenes, and graphite oxide. Examples of metals include copper, nickel, aluminum, silver, and gold. Examples of inorganic compounds include tungsten carbide, titanium carbide, tantalum carbide, molybdenum carbide, titanium boride, and titanium nitride. Examples of electrically conductive polymers include polyaniline, polypyrrole, and polythiophene. One of these materials may be used alone, or two or more may be used as a mixture.

Examples of binders include polyvinylidene fluoride, vinylidene fluoride-hexafluoropropylene copolymers, vinylidene fluoride-tetrafluoroethylene copolymers, polytetrafluoroethylene, carboxymethyl cellulose, polyacrylic acid, styrene-butadiene rubber, polypropylene, polyethylene, and polyimides. One of these materials may be used alone, or two or more may be used as a mixture.

Examples of ionic conductors include a polymer electrolyte and an inorganic solid electrolyte. The polymer electrolyte may be a gel polymer electrolyte or solid polymer electrolyte. Examples of host polymers in the polymer electrolyte include polymethyl methacrylate, polyvinylidene fluoride, and polyethylene oxide. The electrolyte hosted by the host polymer can be any electrolyte that has magnesium ion conductivity and may be a solution of a magnesium salt in a nonaqueous solvent or an ionic liquid (e.g., $Mg(Tf)_2$). An example of an inorganic solid electrolyte is $MgSc_2Se_4$.

The solvent for dispersing the cathode active material, electrically conductive agent, and binder can be, for example, N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. The dispersant may contain, for example, a thickening agent added thereto. Examples of thickening agents include carboxymethyl cellulose and methyl cellulose.

The formation of the cathode active material layer 13 can be, for example, as follows. First, the cathode active material, an electrically conductive agent, and a binder are mixed. The resulting mixture is combined with an appropriate solvent to give a cathode mixture in paste form. This cathode mixture is then applied to the surface of the cathode collector 12 and dried, forming a cathode active material layer 13 on the cathode collector 12. The cathode active material layer 13 may be compressed to increase the electrode density.

The thickness of the cathode active material layer 13 is not critical. For example, it is 1 μm or more and 100 μm or less.

The cathode collector 12 is made of, for example, metal or alloy. More specifically, the cathode collector 12 may be made of a metal selected from, or metals that include at least one selected from, the group consisting of copper, chromium, nickel, titanium, platinum, gold, aluminum, tungsten, iron, and molybdenum or an alloy that contains at least one selected from this group. The cathode collector 12 may be made of, for example, stainless steel.

The cathode collector 12 may be in plate or foil form and may be porous, mesh-like, or non-porous. The cathode collector 12 may be a multilayer film. The cathode collector 12 may have a layer of a carbon material, such as carbon, on its surface on which it comes into contact with the cathode active material layer 13.

If the casing 11 doubles as the cathode collector, the cathode collector 12 may be omitted.

[3-3. Anode]

The anode 22 includes, for example, an anode active material layer 17 containing an anode active material and an anode collector 16.

The anode active material layer 17 contains an anode active material capable of occluding and releasing magnesium ions. In this case, the anode active material can be, for example, a carbon material. Examples of carbon materials include graphite, non-graphitic carbon, such as hard carbon and coke, and graphite intercalation compounds.

If necessary, the anode active material layer 17 may further contain an electrically conductive agent and/or a binder. Examples of electrically conductive agents, binders, solvents, and thickening agents that can optionally be used are the same as described in "[3-2. Cathode]."

The thickness of the anode active material layer 17 is not critical. For example, it is 1 μm or more and 50 μm or less.

Alternatively, the anode active material layer 17 contains an anode active material on which magnesium metal can be dissolved and deposited. In this case, the anode active material can be, for example, Mg metal or a Mg alloy. Examples of Mg alloys include alloys of magnesium with at least one selected from aluminum, silicon, gallium, zinc, tin, manganese, bismuth, and antimony.

Examples of materials that can be used to make the anode collector 16 are the same as those listed for the cathode collector 12 in "[3-2. Cathode]." The anode collector 16 may be in plate or foil form.

If the casing 11 doubles as the anode collector, the anode collector 16 may be omitted.

If the anode collector 16 is made of a material that allows magnesium metal to be dissolved and deposited on its surface, the anode active material layer 17 may be omitted. That is, the anode 22 may consist of an anode collector 16 on which magnesium metal can be dissolved and deposited. In this case, the anode collector 16 may be stainless steel, nickel, copper, or iron.

[3-4. Separator]

The material for the separator 14 can be, for example, a porous film, woven fabric, or nonwoven fabric. Examples of nonwoven fabrics include plastic nonwoven fabric, glass-fiber nonwoven fabric, and paper nonwoven fabric. The separator 14 may be made of a polyolefin, such as polypropylene or polyethylene. The thickness of the separator 14 is, for example, from 10 to 300 μm. The separator 14 may be a single-layer film made of a single material or a composite film (or a multilayer film) composed of two or more materials. The porosity of the separator 14 is in the range of, for example, 30% to 70%.

[3-5. Electrolyte]

The electrolyte can be any material that has magnesium ion conductivity.

For example, the electrolyte is a nonaqueous liquid electrolyte. The nonaqueous liquid electrolyte contains a nonaqueous solvent and a magnesium salt dissolved in the nonaqueous solvent.

The nonaqueous solvent can be, for example, a cyclic or linear ether, cyclic or linear carbonate, cyclic or linear carboxylate, pyrocarbonate, phosphate, borate, sulfate, sulfite, cyclic or linear sulfone, nitrile, amide, or sultone.

Examples of cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, crown ethers, and their derivatives. Examples of linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl, and their derivatives.

Examples of cyclic carbonates include ethylene carbonate, propylene carbonate, butylene carbonate, vinylene carbonate, fluoroethylene carbonate, 4,5-difluoroethylene carbonate, 4,4,4-trifluoroethylene carbonate, fluoromethyl ethylene carbonate, trifluoromethyl ethylene carbonate, 4-fluoropropylene carbonate, 5-fluoropropylene carbonate, and their derivatives. Examples of linear carbonates include dimethyl carbonate, ethyl methyl carbonate, diethyl carbonate, methyl propyl carbonate, ethyl propyl carbonate, and methyl isopropyl carbonate, and their derivatives.

Examples of cyclic carboxylates include γ-butyrolactone, γ-valerolactone, γ-caprolactone, ε-caprolactone, α-acetolactone, and their derivatives. Examples of linear carboxylates include methyl acetate, ethyl acetate, propyl acetate, butyl acetate, methyl propionate, ethyl propionate, propyl propionate, butyl propionate, and their derivatives.

Examples of pyrocarbonates include diethyl pyrocarbonate, dimethyl pyrocarbonate, di-tert-butyl dicarbonate, and their derivatives. Examples of phosphates include trimethyl phosphate, triethyl phosphate, hexamethylphosphoramide, and their derivatives. Examples of borates include trimethyl borate, triethyl borate, and their derivatives. Examples of sulfates include trimethyl sulfate, triethyl sulfate, and their derivatives. Examples of sulfites include ethylene sulfite and its derivatives.

Examples of cyclic sulfones include sulfolane and its derivatives. Examples of linear sulfones include alkyl sulfones and their derivatives. Examples of nitriles include acetonitrile, valeronitrile, propionitrile, trimethylacetonitrile, cyclopentanecarbonitrile, adiponitrile, pimelonitrile, and their derivatives. Examples of amides include dimethylformamide and its derivatives. Examples of sultones include 1,3-propane sultone and its derivatives.

One of these substances may be used as a solvent alone, or two or more may be used in combination.

Examples of magnesium salts include $MgBr_2$, $MgI_2$, $MgCl_2$, $Mg(AsF_6)_2$, $Mg(ClO_4)_2$, $Mg(PF_6)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[N(SO_2CF_2CF_3)_2]_2$, $Mg[BF_3C_2F_5]_2$, and $Mg[PF_3(CF_2CF_3)_3]_2$. One of these substances may be used as a magnesium salt alone, or two or more may be used in combination.

Alternatively, the electrolyte may be a solid electrolyte. In this case, examples of solid electrolytes include $Mg_{2-1.5x}Al_x$-$SiO_4$ (where $0.1 \leq x \leq 1$), $Mg_{2-1.5x-0.5y}Al_{x-y}Zn_ySiO_4$ (where $0.5 \leq x \leq 1$, $0.5 \leq y \leq 0.9$, $x-y \geq 0$, and $x+y \leq 1$), $MgZr_4(PO_4)_6$, $MgMPO_4$ (where M denotes at least one selected from Zr, Nb, and Hf), $Mg_{1-x}A_xM(M'O_4)_3$ (where A denotes at least one selected from Ca, Sr, Ba, and Ra, M denotes at least one selected from Ze and Hf, M' denotes at least one selected from W and Mo, and $0 \leq x < 1$), and $Mg(BH_4)(NH_2)$.

4. Experimental Results

[4-1. Production of Cathode Active Materials]
[4-1-1. Sample 1]

First, graphite, calcium boride ($CaB_6$), and calcium carbide ($CaC_2$) powders were prepared as raw materials. The average particle diameters of the graphite, $CaB_6$, and $CaC_2$ powders were 20 μm, 60 μm, and 40 μm, respectively. These raw materials were weighed out to a mass ratio of graphite:$CaB_6$:$CaC_2$=100:62.4:91.5. The apportioned raw materials were crushed and mixed in an agate mortar and pestle. The resulting mixture was put into a firing furnace. With Ar gas introduced into the furnace at a flow rate of 1 L/min, the temperature inside the furnace was increased from room temperature to 1500° C. at a rate of 5° C./min and held at 1500° C. for 5 hours. Then heating was stopped, and the inside of the furnace was allowed to cool. The fired mixture was removed from the furnace and crushed in an agate mortar and pestle. This gave cathode active material sample 1.

[4-1-2. Sample 2]
Cathode active material sample 2 was produced in the same way as sample 1 except that
the mass ratio was graphite:$CaB_6$:$CaC_2$=100:43.6:53.3.

[4-1-3. Sample 3]
Cathode active material sample 3 was produced in the same way as sample 1 except that:
the mass ratio was graphite:$CaB_6$:$CaC_2$=100:43.6:53.3; and
the temperature was increased from room temperature to 1800° C. at a rate of 5° C./min and held at 1800° C. for 50 hours.

[4-1-4. Sample 4]
Cathode active material sample 4 was produced in the same way as sample 1 except that:
the $CaB_6$ powder was replaced with a boron powder (average particle diameter, 60 μm);
the $CaC_2$ powder was replaced with a magnesium powder (average particle diameter, 40 μm);
the mass ratio was graphite:B:Mg=100:90.0:98.8; and
the temperature was increased from room temperature to 1000° C. at a rate of 5° C./min and held at 1000° C. for 5 hours.

[4-1-5. Sample 5]
Cathode active material sample 5 was produced in the same way as sample 1 except that:
the $CaB_6$ powder was replaced with a boron powder (average particle diameter, 80 μm);
the $CaC_2$ powder was replaced with a lithium hydride powder (average particle diameter, 40 μm);
the mass ratio was graphite:B:LiH=100:90.0:66.2; and
the temperature was increased from room temperature to 1000° C. at a rate of 5° C./min and held at 1000° C. for 5 hours.

[4-1-6. Sample 6]
A graphite powder having an average particle diameter of 20 μm was prepared as cathode active material sample 6.

[4-1-7. Sample 7]
Cathode active material sample 7 was produced in the same way as sample 1 except that:
the $CaB_6$ powder was replaced with a boron powder (average particle diameter, 80 μm);
the $CaC_2$ powder was not used;
the mass ratio was graphite:B=100:27.8; and
the temperature was increased from room temperature to 1800° C. at a rate of 5° C./min and held at 1800° C. for 5 hours.

[4-1-8. Sample 8]
A vanadium oxide ($V_2O_5$) powder having an average particle diameter of 50 μm was prepared as cathode active material sample 8.

Figure 2:
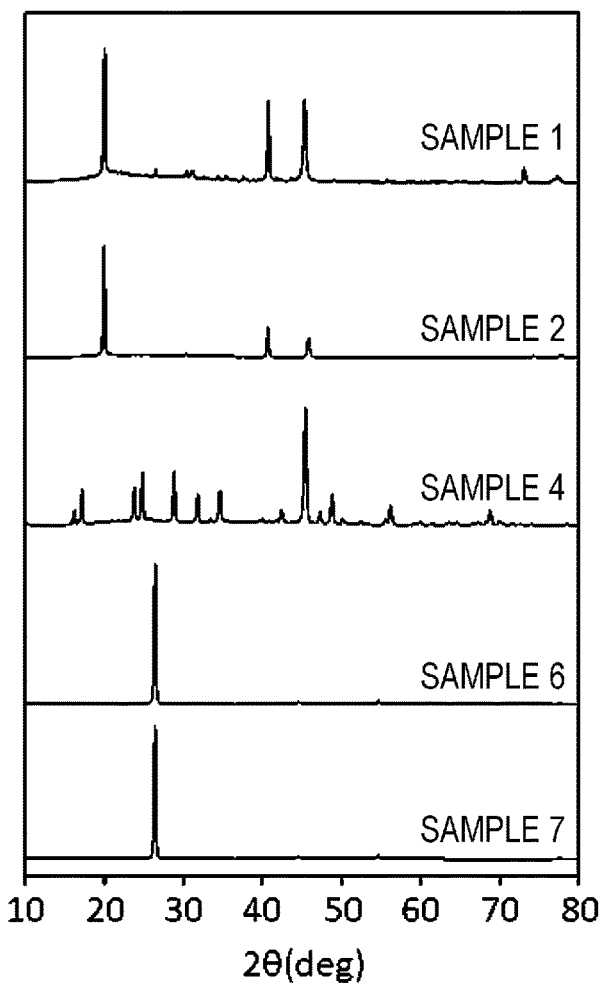
FIG. 2 illustrates X-ray diffraction (XRD) charts from cathode active material samples 1, 2, 4, 6, and 7.

[4-2. X-Ray Diffraction]
Samples 1, 2, 4, 6, and 7 were analyzed by x-ray diffraction (XRD). FIG. 2 illustrates XRD charts from these samples.

As shown in FIG. 2, samples 1, 2, and 4 exhibited XRD patterns different from those of samples 6 and 7. This indicates that carbon materials containing carbon, boron, and a metal (Ca, Mg, or Li) are structurally different from graphite.

Specifically, the XRD patterns of samples 1, 2, and 4 had a peak assigned to the (002) plane at 2θ of 20.4°, 20.6°, and 23.9°, respectively. The XRD patterns of samples 6 and 7 both had a peak assigned to the (002) plane at 2θ of 26.4°. That is, the XRD patterns of samples 1, 2, and 4 had the (002) plane peak at smaller angles than those of samples 6 and 7. This result provides evidence that samples 1, 2, and 4 had a greater gap between layers of the carbon material than samples 6 and 7. The carbon material in samples 1 and 2 contained calcium, and the inventors believe that the presence of calcium resulted in the interlayer gap greater than that of graphite. The XRD pattern of sample 4 exhibited multiple weaker peaks caused by a boron-rich graphite phase beside the (002) plane peak.

[4-3. Fabrication of Battery Cells]
Battery cells 1 to 8 for testing were fabricated using cathode active material samples 1 to 8. The entire process of the fabrication of the batteries was performed in an Ar glove box with a dew point of −60° C. or lower and an oxygen level of 1 ppm or less.

[4-3-1. Battery Cells 1 to 5]

First, cathode active material sample 1, acetylene black, and polyvinylidene fluoride (PVdF) were weighed out to a mass ratio of 8:1:1. The apportioned sample 1 and acetylene black were mixed in an agate mortar and pestle to homogeneity, and the resulting mixture was mixed in the agate mortar and pestle again, with the apportioned PVdF added this time. This gave a cathode mixture, and this cathode mixture was dispersed in N-methylpyrrolidone (NMP) to form cathode mixture slurry.

A 20-μm thick stainless steel sheet was prepared as a cathode collector. The stainless steel sheet was coated with the cathode mixture slurry using a coater, and the slurry was thoroughly dried to give a cathode sheet. The cathode sheet was rolled to 100 μm using a roller press, and a 20 mm×20 mm square was punched out to give a cathode containing sample 1.

A 20 mm×20 mm square was cut out of a 100-μm thick piece of magnesium, its surface was ground to remove the covering oxide, and the ground surface was washed with acetone. The resulting piece of magnesium was pressure-bonded with a 3 mm×30 mm nickel mesh for use as a lead wire. This gave an anode.

Magnesium bis(trifluoromethanesulfonyl)imide (Mg(TFSI)$_2$; Mg[N(CF$_3$SO$_2$)$_2$]$_2$) was dissolved in triethylene glycol dimethyl ether (triglyme), a nonaqueous solvent, to a concentration of 0.3 mol/liter. This gave a nonaqueous liquid electrolyte.

With the cathode as the test electrode and the anode as the reference and counter electrode, a battery cell for testing was fabricated. A polyethylene microporous film as a separator was impregnated with the nonaqueous liquid electrolyte, and the test and counter electrodes were placed to face each other with the separator therebetween. In this state, the test electrode, counter electrode, and separator were put into a sheath, and the opening of the sheath was sealed to give battery cell 1 as a battery cell made using sample 1.

Battery cells 2 to 5, using samples 2 to 5, were fabricated in the same way.

[4-3-2. Battery Cell 6]

Battery cell 6, using sample 6, was fabricated in the same way as battery cell 1 except that:
no acetylene black was used in the cathode mixture;
the mass ratio was graphite:PVdF=9:1; and
the cathode collector was a 12-μm thick copper sheet instead of the stainless steel sheet.

[4-3-3. Battery Cell 7]

Battery cell 7, using sample 7, was fabricated in the same way as battery cell 1 except that:
no acetylene black was used in the cathode mixture;
the mass ratio was boron carbide (BC):PVdF=9:1; and
the cathode collector was a 12-μm thick copper sheet instead of the stainless steel sheet.

[4-3-4. Battery Cell 8]

Battery cell 8, using sample 8, was fabricated in the same way as battery cell 1 except that
the cathode collector was a 20-μm thick platinum sheet instead of the stainless steel sheet.

[4-4. Charge and Discharge Test]

Battery cells 1 to 8 were subjected to a charge and discharge test. This test was performed in a thermostat bath at 25° C.

For battery cells 1 to 5, the charge and discharge characteristics were evaluated as follows. First, with the current density at the test electrode set to 1 mA/cm$^2$, the battery was charged until the potential difference from the reference electrode potential reached 2.5 V. The battery was then discharged at a current density of 1 mA/cm$^2$ with the end-of-discharge voltage set to 0 V. Then the battery was rested for 20 minutes.

For battery cells 6 to 8, the charge and discharge characteristics were evaluated as follows. First, the battery was discharged at a current density of 1 mA/cm$^2$ with the end-of-discharge voltage set to 0 V. Then, with the current density at the test electrode set to 1 mA/cm$^2$, the battery was charged until the potential difference from the reference electrode potential reached 2.5 V. Then the battery was rested for 20 minutes.

Table 1 summarizes the as-synthesized composition of the cathode active material and initial charge and discharge capacities for battery cells 1 to 8.

TABLE 1

|  | Composition (as-synthesized) | Initial charge capacity [mAh/g] | Initial discharge capacity [mAh/g] |
| --- | --- | --- | --- |
| Battery cell 1 | $Ca_{0.12}B_{0.23}C_{0.77}$ | 111 | 95 |
| Battery cell 2 | $Ca_{0.084}B_{0.20}C_{0.80}$ | 104 | 65 |
| Battery cell 3 | $Ca_{0.068}B_{0.19}C_{0.81}$ | 92 | 67 |
| Battery cell 4 | $Mg_{0.22}B_{0.48}C_{0.52}$ | 153 | 100 |
| Battery cell 5 | $Li_{0.45}B_{0.48}C_{0.52}$ | 110 | 73 |
| Battery cell 6 | Graphite | 3 | 1 |
| Battery cell 7 | $B_{0.14}C_{0.86}$ | 5 | 8 |
| Battery cell 8 | $V_2O_5$ | 53 | 49 |

As shown in Table 1, battery cells 1 to 5 exhibited large initial charge and discharge capacities in comparison with battery cells 6 to 8.

[4-5. Composition in Charged and Discharged States]

After the charge and discharge test, cathode active material samples 1, 2, and 4 were subjected to elemental analysis based on ICP emission spectrometry. The composition of sample 1 was $Mg_{0.030}Ca_{0.078}B_{0.23}C_{0.77}$, that of sample 2 was $Mg_{0.013}Ca_{0.055}B_{0.20}C_{0.80}$, and that of sample 4 was $Mg_{0.19}B_{0.48}C_{0.52}$, indicating that all samples retain Mg in their discharged state. These results suggest that samples 3 and 5, too, retain Mg in their discharged state.

Battery cells 1 to 5 therefore correspond to examples of magnesium secondary batteries according to an embodiment, and battery cells 6 and 7 correspond to comparative examples of magnesium secondary batteries. Samples 1 to 5 that completed initial charging correspond to examples of cathode active materials according to an embodiment. The as-synthesized sample 4 corresponds to an example of a cathode active material according to an embodiment.

What is claimed is:

1. A magnesium secondary battery comprising:
    a cathode containing a cathode active material;
    an anode; and
    an electrolyte that has magnesium ion conductivity,
    wherein the cathode active material comprises:
        a material containing magnesium, boron, and carbon, wherein
        the material has a layered structure,
        the material includes a plurality of layers each containing the boron and the carbon, and
        the magnesium is positioned between the layers.

2. The magnesium secondary battery according to claim 1, wherein the material further contains lithium, and wherein the lithium is positioned in a space between the layers with a magnesium does not occupy.

3. The magnesium secondary battery according to claim 1, wherein
the material further contains calcium, and wherein the calcium is positioned in a space between the layers where the magnesium does not occupy.

4. The magnesium secondary battery according to claim 1, wherein the material is represented by a formula $Mg_xM_yB_zC_{1-z}$, where M is Li or Ca, $x>0$, $y\geq0$, and $x+y<z<1.0$.

5. The magnesium secondary battery according to claim 4, wherein $z\leq0.5$.

6. The magnesium secondary battery according to claim 5, wherein M is Ca.

7. The magnesium secondary battery according to claim 6, wherein $z\leq0.25$.

8. The magnesium secondary battery according to claim 1, wherein the magnesium is released from and occluded into the material in response to charging and discharging of the magnesium secondary battery.

9. The magnesium secondary battery according to claim 1, wherein the anode contains magnesium metal or a magnesium-containing alloy.

10. The magnesium secondary battery according to claim 1, wherein the anode consists of an anode collector on which magnesium metal is dissolved and deposited.

* * * * *